United States Patent
Zhang et al.

(10) Patent No.: US 11,693,989 B2
(45) Date of Patent: Jul. 4, 2023

(54) COMPUTER-IMPLEMENTED METHODS AND NODES IMPLEMENTING PERFORMANCE ESTIMATION OF ALGORITHMS DURING EVALUATION OF DATA SETS USING MULTIPARTY COMPUTATION BASED RANDOM FOREST

(71) Applicant: KONINKLIJKE PHILIPS N.V., Eindhoven (NL)

(72) Inventors: Lu Zhang, Eindhoven (NL); Meilof Geert Veeningen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 325 days.

(21) Appl. No.: 16/954,728

(22) PCT Filed: Dec. 12, 2018

(86) PCT No.: PCT/EP2018/084436
§ 371 (c)(1),
(2) Date: Jun. 17, 2020

(87) PCT Pub. No.: WO2019/121182
PCT Pub. Date: Jun. 27, 2019

(65) Prior Publication Data
US 2020/0387636 A1 Dec. 10, 2020

Related U.S. Application Data

(60) Provisional application No. 62/608,728, filed on Dec. 21, 2017.

(51) Int. Cl.
*G06F 21/62* (2013.01)
*G06F 21/78* (2013.01)
(Continued)

(52) U.S. Cl.
CPC .......... *G06F 21/6254* (2013.01); *G06F 9/505* (2013.01); *G06F 9/5027* (2013.01);
(Continued)

(58) Field of Classification Search
None
See application file for complete search history.

(56) References Cited

U.S. PATENT DOCUMENTS

| 4,867,535 A | 9/1989 | Dicjempos |
| 7,844,717 B2 | 11/2010 | Herz et al. |

(Continued)

OTHER PUBLICATIONS

De Hoogh, S. et al., "Practical secure decision tree learning in a teletreatment application". International Conference on Financial Cryptography and Data Security, pp. 179-194, Springer 2014.
(Continued)

*Primary Examiner* — Michael W Ayers

(57) ABSTRACT

According to an aspect, there is provided a computer-implemented method of operating a first node. The first node has an algorithm for evaluating input data from another node, with the input data having a plurality of different attributes. The method comprises receiving, from a second node, a proposal for the evaluation of a first set of input data by the algorithm; estimating the performance of the algorithm in evaluating the first set of input data based on the proposal; and outputting, to the second node, an indication of the estimated performance of the algorithm. A corresponding first node is also provided.

24 Claims, 4 Drawing Sheets

(51) Int. Cl.
  *H04L 9/08*    (2006.01)
  *G06F 9/50*    (2006.01)
  *G06F 9/52*    (2006.01)

(52) U.S. Cl.
  CPC .......... *G06F 9/5055* (2013.01); *G06F 9/5083* (2013.01); *G06F 9/528* (2013.01); *G06F 21/78* (2013.01); *H04L 9/085* (2013.01); *G06F 21/6245* (2013.01); *H04L 2209/46* (2013.01); *H04L 2209/50* (2013.01); *H04L 2209/80* (2013.01)

(56) References Cited

U.S. PATENT DOCUMENTS

| | | | |
|---|---|---|---|
| 8,250,013 | B2 | 8/2012 | De Ruysscher et al. |
| 9,495,139 | B2 | 11/2016 | Stitt et al. |
| 11,210,604 | B1* | 12/2021 | Jeffery .................. G06N 20/00 |
| 2012/0041741 | A1* | 2/2012 | Aarts ..................... G06F 30/33 |
| | | | 703/13 |
| 2015/0310335 | A1* | 10/2015 | Fan ........................ G06F 30/20 |
| | | | 706/46 |
| 2016/0156595 | A1 | 6/2016 | Feng et al. |
| 2016/0358070 | A1* | 12/2016 | Brothers .............. G06N 3/0454 |
| 2017/0083818 | A1* | 3/2017 | Goto ..................... G06N 20/00 |
| 2018/0018590 | A1* | 1/2018 | Szeto .................... G06N 20/10 |
| 2019/0007512 | A1* | 1/2019 | Li ....................... G06F 3/04842 |
| 2019/0008461 | A1* | 1/2019 | Gupta ................... G16H 50/70 |

OTHER PUBLICATIONS

Keller, M. et al., "Mascot: Faster malicious arithmetic secure computation with Oblivious transfer". Technical report, Cryptology ePrint Archive, 2016, http://eprint.iacr.org/2016/505.

International Search Report for PCT/EP2018/084436 dated Dec. 12, 2018.

Fung, G. et al., "Privacy-Preserving Predictive Models for Lung Cancer Survival Analysis". P3DM'08, Apr. 26, 2008, Atlanta, Georgia.

Wu, D. "Computing on encrypted Data". Secure Internet of Things Seminar. Jan. 2015.

* cited by examiner

COMPUTER-IMPLEMENTED METHODS AND NODES IMPLEMENTING PERFORMANCE ESTIMATION OF ALGORITHMS DURING EVALUATION OF DATA SETS USING MULTIPARTY COMPUTATION BASED RANDOM FOREST

CROSS-REFERENCE TO PRIOR APPLICATIONS

This application is the U.S. National Phase application under 35 U.S.C. § 371 of International Application No. PCT/EP2018/084436, filed on Dec. 12, 2018, which claims the benefit of U.S. Patent Application No. 62/608,728, filed on Dec. 21, 2017. These applications are hereby incorporated by reference herein.

FIELD OF THE INVENTION

This disclosure relates to the evaluation of sets of input data by an algorithm, and in particular relates to techniques for enabling a user or data owner to customise or adapt the execution by the algorithm to their requirements.

BACKGROUND OF THE INVENTION

With the rapid development of big data analysis in academia, the demand for applying this technique to practical cases is increasing as well. Quite often, security is one of the biggest challenges due to the sensitivity of the data. For instance, data owners (like hospitals, banks, governments, etc.) would prefer to have their data analysed by algorithm owners without providing the original data to the algorithm owner.

One way to achieve this is for all data to be encrypted in order to prevent information leaking, and the algorithm executed on the encrypted data. With such a multiparty computation setup, both parties (data and algorithm owners) interact in a cryptographic protocol (e.g., garbled circuits) and hence can compute any function without learning any information about each other's inputs. Therefore, the focus of data analysis becomes how to apply machine learning algorithms to fully encrypted data. Algorithms like Naïve Bayes, decision trees, linear discriminant classifiers, and more general kernel methods have been developed for privacy-preserving data analysis. However, in analysis with fully encrypted data, it is difficult to avoid increasing computational complexity compared to analysis without encryption, and thus the speed and security level provided by the algorithm are important considerations for the data owner.

SUMMARY OF THE INVENTION

With these challenges, applicability of the current frameworks in practice is still a problem. From the point of view of the data owner the algorithm is quite often functioning like a 'black box', and the users (data owners) have little ability to alter the algorithm to their own requirements, particularly regarding efficiency, accuracy and sensitivity.

It has been found that if a data owner decides not to disclose a particular attribute (e.g. data field) to the evaluation then this can provide high efficiency, high privacy, but low utility. It has also been found that encrypting an attribute (so as to keep that data secret from the algorithm owner) has high privacy and high utility, but low efficiency. It has also been found that using an attribute unencrypted has high efficiency and high utility, but low privacy.

In practice, a number of different cases may apply to a user (data owner). Firstly, it may be that not all of the attributes of the data are sensitive (e.g. gender), and these attributes may not need to be analysed in a secured way considering that secured analysis is time consuming. However, in analysing with encrypted data, the user has no flexibility to define the sensitivity of the attributes to gain efficiency. Secondly, the user has no option to change the algorithm for a quick but less accurate analysis or a slow but highly accurate analysis. Thirdly, the user often doesn't have data with all the attributes required by the algorithm, or the user may just want to perform the analysis based on subset of the attributes.

Therefore, there is a need for ways to enable a user to customise or adapt the evaluation of a set of input data by an algorithm to meet their own requirements for the evaluation, such as speed and accuracy.

According to a first specific aspect, there is provided a computer-implemented method of operating a first node, the first node having an algorithm for evaluating input data from another node, the input data having a plurality of different attributes, the method comprising receiving, from a second node, a proposal for the evaluation of a first set of input data by the algorithm; estimating the performance of the algorithm in evaluating the first set of input data based on the proposal; and outputting, to the second node, an indication of the estimated performance of the algorithm.

According to a second aspect, there is provided a computer program product comprising a computer readable medium having computer readable code embodied therein, the computer readable code being configured such that, on execution by a suitable computer or processor, the computer or processor is caused to perform the method according to the first aspect.

According to a third aspect, there is provided a first node, the first node having an algorithm for evaluating input data from another node, the input data having a plurality of different attributes, wherein the first node is configured to receive, from a second node, a proposal for the evaluation of a first set of input data by the algorithm; estimate the performance of the algorithm in evaluating the first set of input data based on the proposal; and output, to the second node, an indication of the estimated performance of the algorithm.

According to a fourth aspect, there is provided a computer-implemented method of operating a second node, the second node having a first set of input data to be evaluated by an algorithm of a first node, the input data having a plurality of different attributes, the method comprising sending, to the first node, a proposal for the evaluation of the first set of input data by the first node using the algorithm; receiving, from the first node, an estimate of the performance of the algorithm in evaluating the first set of input data based on the proposal; and determining whether to proceed with the evaluation of the first set of input data based on the received estimate.

According to a fifth aspect, there is provided a computer program product comprising a computer readable medium having computer readable code embodied therein, the computer readable code being configured such that, on execution by a suitable computer or processor, the computer or processor is caused to perform the method according to the fourth aspect.

According to a sixth aspect, there is provided a second node, the second node having a first set of input data to be evaluated by an algorithm of a first node, the input data having a plurality of different attributes, wherein the second node is configured to send, to the first node, a proposal for the evaluation of the first set of input data by the first node using the algorithm; receive, from the first node, an estimate of the performance of the algorithm in evaluating the first set of input data based on the proposal; and determine whether to proceed with the evaluation of the first set of input data based on the received estimate.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

The embodiments described herein relate to the evaluation of sets of input data by an algorithm, and in particular relate to techniques for enabling a user or data owner to customise or adapt the execution by the algorithm to their requirements.

Figure 1:
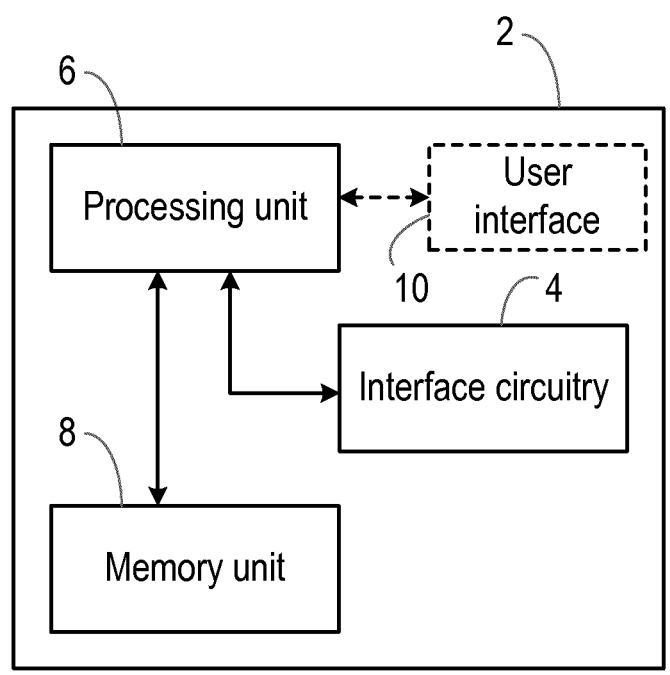
FIG. 1 is a block diagram of a node according to an embodiment.

FIG. 1 illustrates an exemplary node 2 according to an embodiment. An algorithm owner (i.e. a party that owns or has an algorithm that can be used to evaluate data sets) can be implemented in the form of the node 2 in FIG. 1. Likewise, a data owner (i.e. a party that owns or has a data set that can be evaluated by the algorithm) can be implemented in the form of the node 2 in FIG. 1. In either case, the node 2 can be any type of electronic device or computing device. For example the node 2 can be, or be part of any suitable type of electronic device or computing device, such as a server, computer, laptop, tablet, smart phone, etc. It will be appreciated that the algorithm owner node and the data owner node do not need to be the same type of device, and for example, the algorithm owner node can be a server (e.g. located in the cloud), and the data owner node can be a desktop computer, etc. The node 2 includes interface circuitry 4 for enabling a data connection to and/or data exchange with other devices or nodes, such as an algorithm owner node in the case that the node 2 in FIG. 1 is a data owner node, or a data owner node in the case that the node 2 in FIG. 1 is an algorithm owner node. In particular the interface circuitry 4 can enable a connection between the node 2 and a network, such as the Internet and/or a local area network, via any desired wired or wireless communication protocol. As an example, the interface circuitry 4 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.).

The node 2 further includes a processing unit 6 for performing operations on data and for generally controlling the operation of the node 2, including operating the node 2 to perform the methods and techniques described herein. The interface circuitry 4 is connected to the processing unit 6. The node 2 further includes a memory unit 8 for storing any data, information and/or signals required for the execution of the methods and techniques described herein and for storing computer program code for causing the processing unit 6 to perform method steps as described in more detail below. In embodiments where the node 2 is a data owner node, the memory unit 8 can store one or more data sets. These data sets can comprise data that is private or sensitive (secret) to the data owner node in the sense that the data sets are not to be publicly disclosed to the algorithm owner node (and perhaps other nodes/parties). It will be appreciated that it may be the case that not all data elements or attributes in a data set are private or sensitive.

The processing unit 6 can be implemented in numerous ways, with software and/or hardware, to perform the various functions described herein. The processing unit 6 may comprise one or more microprocessors or digital signal processor (DSPs) that may be programmed using software or computer program code to perform the required functions and/or to control components of the processing unit 10 to effect the required functions. The processing unit 6 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The memory unit 8 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

The node 2 may also include a user interface 10 that includes one or more components that enables a user of node 2 to input information, data and/or commands into the node 2, and/or enables the node 2 to output information or data to the user of the node 2. The user interface 10 can comprise any suitable input component(s), including but not limited to a keyboard, keypad, one or more buttons, switches or dials, a mouse, a track pad, a touchscreen, a stylus, a camera, a microphone, etc., and the user interface 10 can comprise any suitable output component(s), including but not limited to a display screen, one or more lights or light elements, one or more loudspeakers, a vibrating element, etc.

It will be appreciated that a practical implementation of a node 2 may include additional components to those shown in FIG. 1. For example the node 2 may also include a power supply, such as a battery, or components for enabling the node 2 to be connected to a mains power supply.

As noted above, from the point of view of a data owner, an algorithm owned by another party for evaluating their data quite often functions like a 'black box', and the data owner has little ability to alter the algorithm to their own requirements, particularly regarding efficiency, accuracy and sensitivity of the data analysis. The techniques provided herein provide ways to enable a user to customise or adapt the evaluation of a set of input data by an algorithm to meet their own requirements for the evaluation, such as speed and accuracy.

Figure 2:
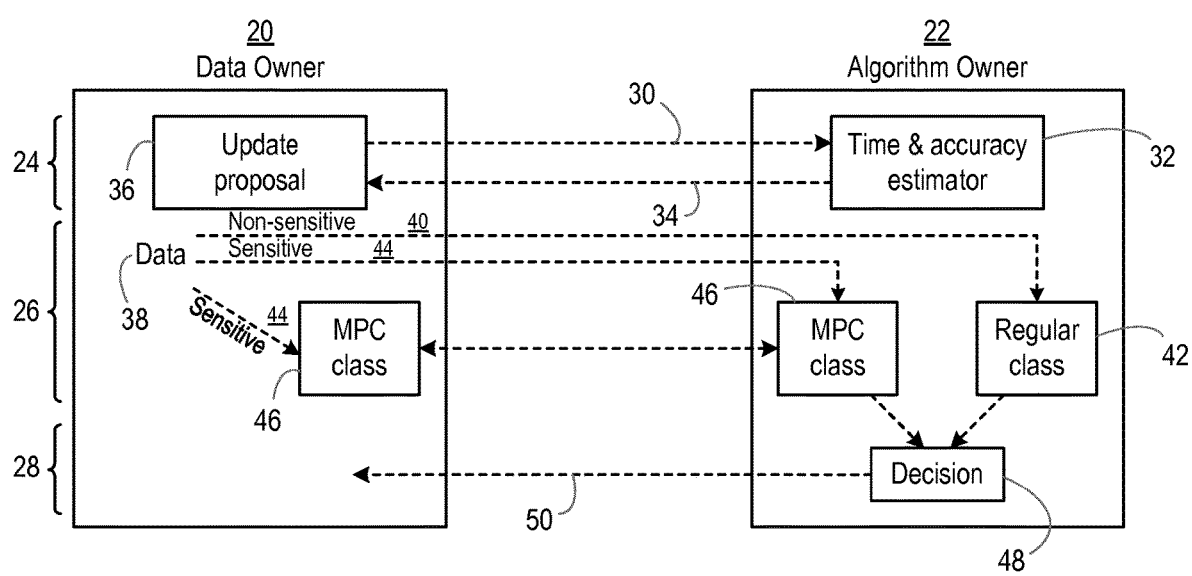
FIG. 2 illustrates operations in a system according to an embodiment.

FIG. 2 illustrates operations in a system according to an embodiment of the techniques provided herein. The system in FIG. 2 comprises a data owner node 20 and an algorithm owner node 22. Both the data owner node 20 and algorithm owner node 22 can be a node 2 as shown in FIG. 1. References herein to the 'data owner' can include the data owner node 20 and/or a user of the data owner node 20. Likewise, references herein to the 'algorithm owner' can include the algorithm owner node 22 and/or a user of the algorithm owner node 22.

The data owner node 20 has one or more data sets that the data owner node 20 would like to have analysed or evaluated. The one or more data sets are private to the data owner node 20, and so the one or more data sets should be analysed or evaluated without sharing or disclosing the data to the party that performs the analysis or evaluation.

The algorithm owner node 22 has one or more algorithms that can be accessed by other parties/nodes (including the data owner node 20) to analyse data sets. The algorithm contains or uses one or more aspects that are secret or private to the algorithm owner, and no other party or node (or at least not the data owner node 20) knows these one or more aspects. Therefore, the algorithm owner 22 provides analysis or evaluation of data sets without sharing the actual algorithm with the data owner node 20. In some cases, the algorithm itself may be private, which means that no other party or node (or at least not the data owner node 20) knows how the algorithm operates on the data sets to produce the output(s). In other cases, the algorithm may be a public or known algorithm, but one or more parameters used in or by the algorithm are secret to the algorithm owner node 22. As an example, the algorithm can be a known support vector machine, but the parameters used for classification (e.g. the location of the hyperplane) are private to the algorithm owner 22.

The algorithm owner node 22 can advertise their algorithm (e.g. indicate that it is available for use in evaluating or analysing data sets), including advantages of the algorithm, the list of required input attributes (e.g. features, measurements, data fields, etc.), the format required for the input data, and/or the form and/or format of the output, etc.

As shown in FIG. 2, the operations in the system comprise three stages, a pre-analysis stage 24, an analysis stage 26 and a results stage 28. In the pre-analysis stage 24, the data owner node 20 determines and sends (signal 30) a proposal to the algorithm owner node 22. The proposal may indicate the type or content of the data set to be analysed (without disclosing the data set content itself) and/or various requirements of the analysis of a particular data set, such as a minimum accuracy level required for the output, a maximum time that the analysis should take, etc.

More specifically, the proposal 30 can include information on the size of the data set, for example the number of data elements and/or the number of attributes (e.g. data fields) in the data set to be analysed. If the number of input attributes indicated in the proposal 30 is smaller than the number of attributes required by the algorithm, then the algorithm owner node 22 can consider the remaining attributes as 'missing' attributes. The proposal 30 can also or alternatively indicate how many and/or which attributes are private attributes, and could indicate anything from no attributes are private to all attributes are private. As noted above, the proposal 30 can also or alternatively indicate the time budget/minimal accuracy of the analysis. In this way the data owner 20 can get the best (i.e. most accurate) result within this time budget or the fastest result with a minimal accuracy threshold.

Based on the proposal, the algorithm owner node 22 estimates the performance of the algorithm in block 32, for example by estimating the fastest analysis time possible and/or by estimating the best accuracy possible, and provides feedback (signal 34) to the data owner node 20.

In response to the feedback 34, the data owner node 20 can adjust the proposal (block 36), resubmit it to the algorithm owner node 22 (signal 30) and receive feedback on the revised proposal (signal 34). This proposal-feedback loop can continue until the requirements of the data owner node 20 are met.

In the analysis stage 26, based on a proposal 30 that is acceptable to the data owner 20 (which may be the last proposal 30 evaluated by the algorithm owner 22 or an earlier proposal 30 evaluated by the algorithm owner 22), a multiparty computation (MPC) technique is applied or used to perform the data analysis. In particular embodiments, the data owner node 20 having data set 38 sends any public (e.g. non-secret) attributes and/or data elements (indicated by the 'non-sensitive data' 40) to the algorithm owner node 22, and the algorithm owner node 22 analyses this part 40 of the data set with a regular (e.g. non-encrypted) algorithm, as shown by block 42.

For the sensitive (e.g. secret) attributes and/or data elements (indicated by the 'sensitive data' 44), in some embodiments these are provided in encrypted form to the algorithm owner node 22 and are analysed by the encrypted (secret) algorithm using MPC modules in both the data owner node 20 and the algorithm owner node 22, as indicated by MPC blocks 46. Here, "encrypted" is understood to mean any kind of way in which a private value is input into a multi-party computation, e.g., by providing the values in a secret-shared way or in the form of exchanging wire keys for multi-party computation based on garbled circuits. In alternative embodiments, the MPC could be performed by another node on behalf of the algorithm owner node 22. In these embodiments the sensitive (e.g. secret) attributes and/or data elements are provided in encrypted form to the node that is to evaluate the algorithm and are analysed by the encrypted (secret) algorithm using MPC modules in both the data owner node 20 and the other node. It will be appreciated that in these embodiments any public (e.g. non-secret) attributes and/or data elements can be sent to the other node for evaluation using a non-secret algorithm.

In the results stage 28, the algorithm owner node 22 (or the other node that participated in the MPC) makes a final decision (block 48) on the output of the algorithm based on the results of both the non-encrypted part 42 of the analysis and the encrypted parts 46 of the analysis, and sends the result of the decision block 48 to the data owner node 20 (signal 50). The result/output 50 of the algorithm may also indicate the relative accuracy of the output/result to the data owner node 20. Depending on the way in which the encrypted results from the MPC blocks 46 and non-encrypted results from the regular block 42 need to be combined, this component can also be distributed between the data owner node 20 and the algorithm owner node 22 by means of MPC.

The operations outlined above can provide several advantages. One advantage is that it can give the user (the data owner/data owner node 20) the freedom to personalise the algorithm by trading-off among efficiency, accuracy and sensitivity. It should be noted that this really depends on the user as different users have different attributes available and different privacy perceptions/concerns. Another advantage is that it provides fast pre-analysis of efficiency, accuracy and sensitivity based on a user's preference in order to help the user better adjust the algorithm. The operations outlined above provides the user with the ability to switch on any of the following functions or combination of the following functions. For example the user could define the sensitivity of each attribute as public/private in the Data set, in order to trade-off between the speed and security, with the fact that sensitive data is computationally much more expensive to analyse with multiparty computation. Another example is that the user could define a time budget for the algorithm in order to get a quick scan/deep dive analysis with a trade-off between speed and accuracy. Another example is that instead of setting a time budget, the user could trade-off between speed and accuracy by defining a minimal accuracy, and the algorithm can provide the fastest analysis. As another example, the user could have the analysis performed with missing attributes.

Figure 3:
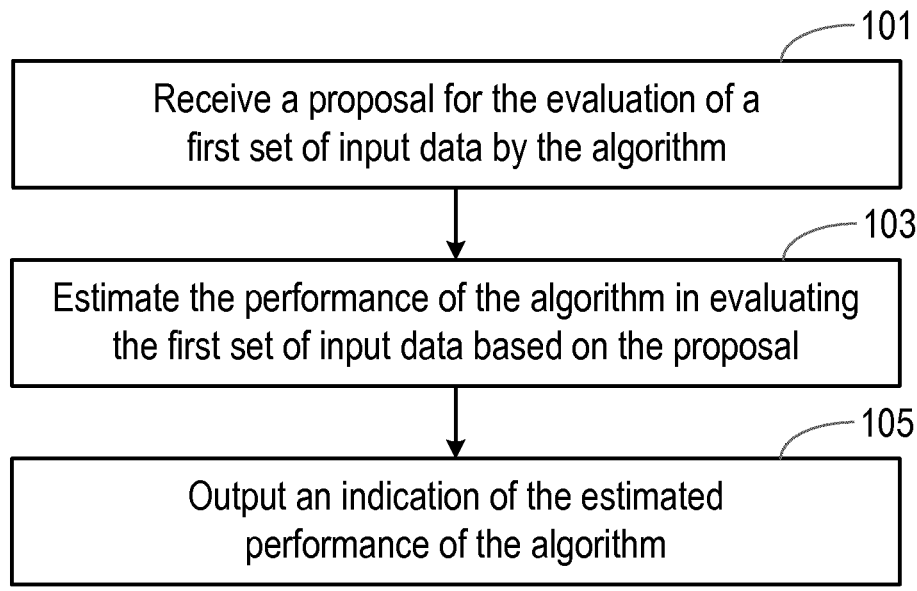
FIG. 3 is a flow chart illustrating an exemplary method of operating a first node that has an algorithm.
Figure 4:
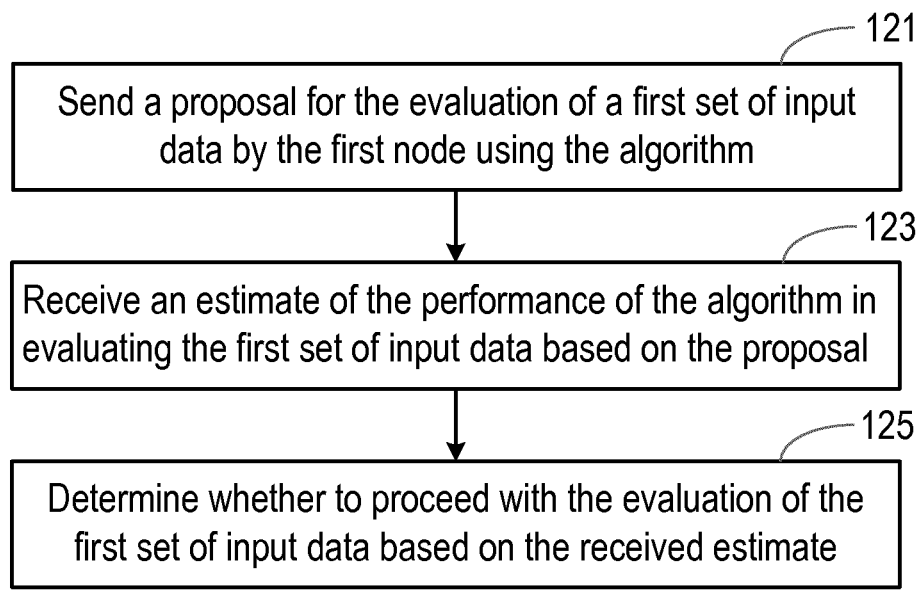
FIG. 4 is a flow chart illustrating an exemplary method of operating a second node that has a data set.

Various embodiments of the techniques presented herein are discussed below with reference to the flow charts in FIG. 3 and FIG. 4. The flow chart in FIG. 3 shows an exemplary method of operating an algorithm owner node 22, which is referred to as a 'first node 22', and the flow chart in FIG. 4 shows an exemplary method of operating a data owner node 20, which is referred to as a 'second node 20'. Both methods can be implemented by the processing unit 6 in the node 2, in conjunction with the interface circuitry 4 and/or memory unit 8 as appropriate.

In step 101 of the method in FIG. 3, the first node 22 receives a proposal 30 for the evaluation of a first set of input data by the algorithm. This proposal is received from the second node 20, the owner of the first set of input data, and the input data is provided with the proposal. The proposal 30 can comprise one or more of an indication of the number of data elements (e.g. data rows/data entries) in the first set of input data, an indication of the attributes (e.g. features, measurements, data fields, etc.) of the first set of input data and an indication of which of the attributes of the first set of input data are private to the second node 20. The proposal 30 can also indicate one of an indication of a minimum accuracy level for the evaluation and an indication of the maximum time permitted to complete the evaluation. The accuracy level could be expressed in terms of a statistical reliability, e.g. that the evaluation should provide results that are 70% accurate, or that are accurate to within 5%, etc.

Based on the received proposal 30, the first node 22 estimates the performance of the algorithm in evaluating the first set of input data (step 103). This step is performed by estimation block 32.

Once the estimate of the performance has been determined, the estimate is output to the second node 20 (step 105).

In some embodiments, the estimate of the performance can be an indication of the accuracy level for the evaluation and/or an indication of the time required to complete the evaluation. As with the indication of the minimum accuracy level above, the estimated accuracy can be expressed in terms of a statistical reliability of the output.

In embodiments where the received proposal 30 comprises an indication of the minimum accuracy level for the evaluation, step 103 can comprise determining an indication of the time required to complete the evaluation at the indicated minimum accuracy level. In this case, the indication of the time required can be determined based on one or more of a complexity level of the algorithm, the number of data elements in the first set of input data, the attributes of the first set of input data and the number of attributes of the first set of input data that are private to the second node.

In general the more private inputs to the algorithm, the more time it takes to evaluate them, and the more complex the algorithm is, the more time it takes to evaluate. For a given algorithm, the features can be ranked accordingly, and a subset of features at the top of the ranking list can be used to optimise on time/accuracy. A high rank reflects the availability, non-sensitivity, and high importance of the feature. The selection of subsets of features stops when the requirement on accuracy/time is satisfied.

In embodiments where the received proposal 30 comprises an indication of the maximum time permitted to complete the evaluation, step 103 can comprise determining an indication of the accuracy level for the evaluation based on completing the evaluation within the indicated maximum time permitted. In this case, the indication of the accuracy level can be determined based on one or more of the number of data elements in the first set of input data, the attributes of the first set of input data (or the number of missing attributes), and the level to which the input attributes are discriminative/important. The indication of the accuracy level can be derived in a similar way to deriving the estimate of the time required to perform the evaluation described above.

After the outputting step, the first node 22 can receive a revised proposal 30 from the second node 20. This revised proposal 30 may indicate a different value for any of the proposal parameters indicated in the initial proposal 30 received in step 101. For example the revised proposal 30 can indicate a different number of data elements in the first set of input data, a different indication of the attributes (e.g. data fields) of the first set of input data and/or a different indication of which attributes of the first set of input data are private to the second node 20. The revised proposal 30 can also or alternatively indicate a different minimum accuracy level for the evaluation and/or a different maximum time permitted to complete the evaluation.

The first node 22 can then repeat steps 103 and 105 for the revised proposal 30.

After outputting the indication in step 105 (whether the indication relates to the initial proposal 30 received in step 101 or to a subsequent revised proposal 30), the first node 22 may receive an indication from the second node 20 that the evaluation of the first set of input data by the algorithm according to a proposal 30 is to proceed. This indication may indicate that the evaluation is to proceed according to the most recent proposal 30 from the second node 20, or to an earlier proposal 30 from the second node 20.

Following that indication, the first node 20 can receive any parts of the input data that are non-private from the second node 20. These received parts are evaluated using the algorithm (e.g. in block 42). In the event that no parts of the first data set are non-private, this part of the method can be skipped.

Any parts of the input data that are private can be evaluated by the algorithm as a multiparty computation with the second node 22. For example the algorithm can be evaluated using a garbled circuit that represents the algorithm and that is generated by the first node 22.

The first node 22 can then combine the results of the evaluation of the received parts of the input data that are non-private (if any) and the result of the evaluation of the received parts of the input data that are private to determine the output of the algorithm. The determined output of the algorithm can then be provided or sent to the second node 20.

In some embodiments, the first node 22 can determine a measure of the accuracy of the output of the algorithm (e.g. a statistical measure of the reliability), and provide the determined measure of the accuracy to the second node 20.

In some embodiments, the proposal received in step 101 (or a subsequent revised proposal 30) can comprise an indication of the minimum accuracy level for the evaluation, and the method can further comprise the step of optimising the algorithm to provide at least the indicated minimum accuracy level while minimising the time required for the evaluation. The time can be minimised based on three factors: the number of missing attributes in the input data, the number of sensitive attributes, and the importance of the attributes. Given a minimum accuracy level that is to be achieved, the first node 22 determines how to provide the fastest result. For an optimisation, a subset of the available attributes can be selected, based on the importance/significance of the attribute, while balancing the number of sensitive (private) attributes to use in the evaluation. The attributes can be added one by one based on rank, and it stops when the requirement is satisfied. The rank of attributes reflects if the attribute is missing, if the attribute is sensitive and if the attribute is discriminative.

In some embodiments, the proposal received in step 101 (or a subsequent revised proposal 30) can comprise an indication of the maximum time permitted for the evaluation, and the method can further comprise the step of optimising the algorithm to maximise the accuracy level of the evaluation within the indicated maximum time permitted for the evaluation. This optimisation can be performed as described above.

In some embodiments, the algorithm can be evaluated using a random forest implementation based on multiparty computation. This MPC-based random forest implementation can be used to evaluate any part of the input data for which attributes are private to the second node 20. It will be appreciated that the MPC-based random forest implementation can also, if required or desired, be used to evaluate any part of the input data that is not private.

In these embodiments, step 103 comprises determining an indication of a time required to complete the evaluation of the first set of input data by determining an evaluation time cost for evaluating all encrypted trees in the random forest to be used for the evaluation (where the encrypted trees are used to evaluate attributes of the first set of input data that are private to the second node 20), determining an input time cost for evaluating all inputs to the algorithm (where the input time cost is the time cost of inputting private attributes to the algorithm), and determining the indication of the time required as the sum of the determined evaluation time cost and the determined input time cost. Further details of the way in which the indication of the time required is determined are provided below with reference to the MPC-based random forest implementation.

Turning now to FIG. 4 and the method of operating the second node 20 (the data owner node 20), the second node 22 has a first set of input data to be evaluated by an algorithm of the first node 22. The input data has a plurality of different attributes (e.g. data fields).

In a first step, step 121, the second node 20 sends a proposal 30 for the evaluation of the first set of input data using the algorithm to the first node 22. The proposal 30 can be as described above with reference to step 101.

Following the sending of the proposal, in step 123 the second node 20 receives an estimate of the performance of the algorithm in evaluating the first set of input data according to the proposal from the first node 22. The estimate of the performance of the algorithm can indicate one or both of an indication of the accuracy level for the evaluation of the first set of input data and an indication of a time required to complete the evaluation of the first set of input data. In embodiments where the proposal 30 included an indication of the minimum accuracy level for the evaluation, the received estimate of the performance can indicate the time required to complete the evaluation at the indicated minimum accuracy level. In embodiments where the proposal 30 included an indication of the maximum time permitted to complete the evaluation of the first set of input data, and wherein the received estimate of the performance comprises an indication of the accuracy level for the evaluation of the first set of input data based on completing the evaluation of the first set of input data in the indicated maximum time permitted.

Then, the second node 20 determines whether to proceed with the evaluation of the first set of input data based on the received estimate. The second node 20 can take this decision based on whether the indicated performance meets the second node's requirements. In some embodiments, if the second node 20 indicated a minimum accuracy level for the evaluation in the proposal 30, the second node 20 can determine whether the indicated time required for the evaluation is acceptable (e.g. based on a value set by the second node 20 prior to sending the proposal 30). In some embodiments, if the second node 20 indicated a maximum time permitted for the evaluation in the proposal 30, the second node 20 can determine whether the indicated accuracy level for the evaluation is acceptable (e.g. based on a value set by the second node 20 prior to sending the proposal 30).

Alternatively, the second node 20 can take this decision in response to an input by a user of the second node 20 (e.g. via the user interface 10). In that case, the second node 20 can provide or display information to the user, for example using the user interface 10, relating to the received indication of the performance, and prompt or await the user to input an indication of whether the evaluation is to proceed.

If the second node 20 determines that the evaluation of the first set of input data based on the proposal 30 sent in step 121 is not to proceed (either based on a user input or analysis by the second node 20 itself), then the second node 20 can determine a revised proposal for the evaluation of the first set of input data. The revised proposal 30 may be determined by the second node 20 itself, or it can be determined in response to or based on an input from a user of the second node 20.

The revised proposal 30 can be determined in a number of ways. For example, the second node 20 or user of the second node 20 could adjust one or more of the number of data elements to be evaluated, the number of attributes of the first set of input data and the number of attributes that are private to the second node. Alternatively or in addition, the second node 20 or user could adjust one of the minimum accuracy level required for the evaluation and the maximum time permitted to complete the evaluation.

The second node 20 or user may determine that the evaluation is not to proceed if the received indication of the performance does not meet its requirements in some respect. For example, the initial proposal 30 may have indicated a minimum accuracy level in step 101, and the estimate of the time to perform this evaluation may be longer than required. In that case, the revised proposal 30 could lead to a reduction in the time taken to perform the evaluation (e.g. by including reducing the number of attributes, reducing the number of private attributes, etc.). Likewise, the initial proposal 30 may have indicated a maximum time permitted in step 101, and the estimate of the accuracy level may be lower than required. In that case, the revised proposal 30 can lead to an increase in the accuracy provided by the evaluation (e.g. by including more attributes, more private attributes, more input data, etc.).

It will be appreciated that the second node 20 or user may determine from the received indication of the performance that the performance exceeds its requirements in some respect. In that case, a revised proposal 30 may also be determined. For example, the initial proposal 30 may have indicated a minimum accuracy level in step 101, and the estimate of the time to perform this evaluation may be less than required by the second node 20. In that case, the revised proposal 30 might lead to an increase in the time taken to perform the evaluation (e.g. by including additional attributes, additional private attributes, etc.). Likewise, the initial proposal 30 may have indicated a maximum time permitted in step 101, and the estimate of the accuracy level may be higher than required. In that case, the revised proposal 30 might lead to a decrease in the accuracy provided by the evaluation (e.g. by including less attributes, less private attributes, a lower maximum time, etc.).

Once the revised proposal 30 is determined, the second node 20 sends the revised proposal 30 to the first node 22. Steps 123 and 125 are then repeated for the revised proposal. Depending on the indication of the performance of the algorithm in response to the revised proposal, the revised proposal may be accepted and the algorithm evaluated, or the revised proposal can be rejected and further revised.

If based on the indication of the performance received in step 123 the evaluation of the first set of input data is to proceed, the second node 20 sends an indication that the evaluation of the first set of input data according to the proposal is to proceed to the first node 22. The second node 20 then sends any parts of the input data that are non-private to the first node 22 (or other node that is to evaluate the non-private input data), and provides any parts of the input data that are private as a private input to a multiparty computation evaluation of the algorithm with the first node 22 (or other node). The second node 20 participates in the multiparty computation and receives an output representing the evaluation of the first set of input data by the algorithm.

In addition to receiving the output, the second node 20 can receive a measure of the accuracy of the output.

The techniques described herein can be instantiated with a number of machine learning algorithms, for instance classification/regression based on support vector machines (SVMs), random forest, Naive Bayes, etc. The following description provides a detailed implementation of the techniques described above with a random forest classifier, particularly in relation to the analysis stage 26 and results stage 28. Some of the other machine learning algorithms are discussed further below.

Figure 5:
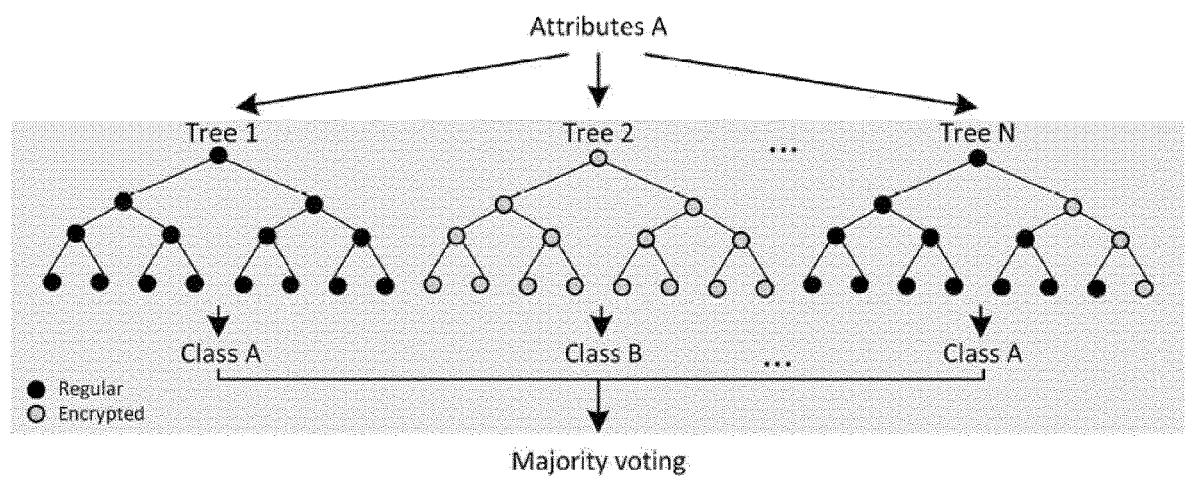
FIG. 5 illustrates a random forest with partially encrypted attributes.

Random forest techniques have three main advantages. They are a relatively flexible and accurate machine learning algorithm, the importance of attributes can be obtained from the algorithm, and the decision tree as its basic unit has previously been successfully applied in secured data analysis. An illustration of a random forest with both public and encrypted (private) attributes is shown in FIG. 5.

The random forest consists of N decision trees $T=\{T_j\}_N$. Each tree outputs a label based on a subset of attributes, the final decision made by the entire random forest is based on majority voting from all trees. In a well-trained random forest, more important attributes appear in more trees.

In the techniques proposed herein, every tree in the random forest has both regular and encrypted versions. Therefore, each input attribute can be either private (encrypted) or public (regular). Exemplary details of implementing a secured decision tree for discrete attribute values can be found in "Practical secure decision tree learning in a teletreatment application" by Sebastiaan de Hoogh, Berry Schoenmakers, Ping Chen, and Harm op den Akker, *International Conference on Financial Cryptography and Data Security*, pages 179-194, Springer, 2014. For instance, the three trees in FIG. 5 (from left to right) represent a regular tree with public attributes, an encrypted tree with private attributes, and an encrypted tree with both public and private attributes, respectively.

In the pre-analysis stage 24, given a proposal 30 from the user/second node 20, the main action in the first node 22 (algorithm owner node 22) is to estimate the best performance of the random forest algorithm with given test time $t_w$, or the fastest test speed (time) of algorithm with given minimal accuracy $\eta_w$.

The user's proposal 30 includes:

(i) a set of predefined attributes $A=\{\alpha_i\}$, which contains encrypted private attributes $A_e$, and public attributes $A \setminus A_e$. The possible missing attributes $A_m$ are not included in the input attributes; and (ii) a time budget $t_w$ or minimal accuracy $\eta_w$ for testing.

Based on the proposal 30, the algorithm owner 22 gives feedback on:

(i) estimated accuracy $\eta_g$ given $t_w$ (as described below), or
(ii) estimated test time $t_g$ given $\eta_w$ (also described below).

Time Cost $t_g$ on Analysis

The time cost $t_g=t_{ev}+t_{in}$ on analysis consists of two parts: 1) evaluation time cost on used encrypted trees $t_{ev}$ and 2) cost on total number of inputs $t_{in}$. The performance depends greatly on the particular backend (garbled circuits, MASCOT, etc.) used. Here, the calculation follows the MASCOT protocol for multiparty computation as described in "Mascot: Faster malicious arithmetic secure computation with oblivious transfer" by Marcel Keller, Emmanuela Orsini, and Peter Scholl, Technical report, Cryptology ePrint Archive, 201 6, http://eprintiacr.org/2016/505.

In MASCOT, performance can be measured based on the number of multiplications and inputs in the protocol (this is not true, e.g., for garbled circuits where the calculation is less straightforward). To simplify the problem in the present example, the trees are assumed to be binary.

Evaluation cost—The evaluation cost of one multiplication is $t_e$, the number of nodes in an encrypted tree $T_j$ is $S_j$, and $|A_e|$ is the total number of encrypted attributes, the time of multiplications performed for evaluating the entire random forest is $t_{ev}=2t_e(|A_e|+1)\Sigma_{j\in T_e}S_j$, where $T_e$ is the set of used encrypted trees.

Input cost—The public inputs to regular trees cost negligible time (which for simplicity are considered to be zero), and thus the time cost on inputs to the entire random forest is equal to the time cost on inputs to encrypted trees. It should be noted that it is assumed that the input cost of a tree equals the cost of the entire forest in order to prevent the leaking of information of exact input attributes to a particular tree. The time cost on one input attribute is $t_\alpha$, the cost on total inputs to the forest is $t_{in}=2\ t_\alpha|A|\Sigma_{j\in T_e}S_j+2t_\alpha|A_e|$ where the first part is the cost of the decision tree and the second part is the cost of the sensitive attributes. Details of the way in which the test time is computed are described further below.

Tree Priorities

The optimization on $\eta_g$ or $t_g$ is influenced by four main factors, which are missing attributes, private attributes, tree importance, and predefined time budget/minimal accuracy.

The regular trees with public non-missing attributes are used in any case since they cost no time and contribute more accuracy.

Missing attributes $A_m$—In classical random forest, the values of training attributes are used to replace the missing attributes $A_m$. In this case, the missing attributes are constant default values, which cost no evaluation time, the same as public attributes. Moreover, when a default value passes through a node, the result can be pre-computed, thus, missing attributes have no input time cost. However, evaluating with such a default attribute cannot give the same accurate result as non-missing attributes do. Therefore the contribution of every tree to the final majority voting is not equal any longer, and the trees with less missing attributes are considered first. This relates to a in the subsection "Weights of trees" below.

Private attributes $A_e$—As mentioned above, the important attributes tend to appear in more trees, and each tree has equal contribution in the majority voting step. Therefore, the problem is how to evaluate as many encrypted trees as possible within a time budget, so that the trees with less nodes are considered first. This relates to β in the subsection "Weights of trees" below.

Tree importance—As more important attributes tend to appear in more trees in trained random forest, trees with more important attributes contribute more accuracy to the final result. This relates to γ in the subsection "Weights of trees" below.

Time budget $t_w$—To prevent the leaking of information of which trees and attributes are selected, the input cost for every tree is the same as the input cost of the entire random forest $t_{in}$. The optimisation is mainly done on time cost $t_{ev}$ and $t_{in}$. Assuming there is only one private attribute, the input cost will be $2t_\alpha |A| \Sigma_{j \in T_e} S_j + 2t_\alpha$, and the evaluation cost will be $4t_e \in_{j \in T_e} S_j$. The time cost on analysis data with one private attribute is $$t_{low} = 2(t_\alpha |A| + 2t_e) \Sigma_{j \in T_e} S_j + 2t_\alpha \quad (1)$$

where $T_e$ is the encrypted tree with highest priority (the priority of trees is discussed in the subsection "Weights of trees" below), and its input contains this private attribute. If $t_w \leq t_{low}$, only public attributes are evaluated; otherwise, at least one private attribute is evaluated by at least one encrypted tree in addition. If $t_w \geq t_{high}$, all input attributes are evaluated. The $t_{high}$ is computed as $$t_{high} = 2[t_\alpha |A| + t_e(|A_e|+1)] \Sigma_{j \in T_e} S_j + 2t_\alpha |A_e| \quad (2)$$

To help the user of the second node 20 adjust the proposal 30 in the pre-analysis stage 24, the algorithm owner node 22 could feedback $t_{low}$ and $t_{high}$ as well.

Minimal accuracy $\eta_w$—When minimal accuracy $\eta_w$ is set, the algorithm should analyse in the fastest way. To do so, trees with less nodes are considered first, trees with less missing attributes are considered first, and trees with more important attributes are considered first. This relates to w in the subsection "Weights of trees" below.

Weights of trees w—If $t_w \leq t_{high}$, it is impossible to evaluate all trees. In this case, weights of trees w is introduced in order to set up priority. The weights consists of three parts:
α, which is the fraction of evaluated non-missing attributes in a tree. For instance, if a tree requires input of 10 attributes, but only 8 attributes are provided by the user/second node 20, then α=0:8 in this tree);
β, which represents the evaluation cost $\beta_j = 1 - S_1/\Sigma_{j \in T_e} S_j$, where $S_j$ is the number of nodes in encrypted tree, and trees with less nodes has higher priority;

γ, which reflects tree importance. The calculation of $\gamma_i$ for tree $T_j$ is as follows. The total input attributes score (e.g. a Z score) of tree $T_j$ is obtained by computing $Z_j = \Sigma_{i \in T_j} Z(\alpha_i)$, where $Z(\alpha_i)$ indicates the Z score of attribute $\alpha_i$. The total score of all trees is $Z_j = \Sigma_{i \in T_j} Z(\alpha_i)$, and $\gamma_i$ can be defined as $\gamma_1 = Z_j/Z$.

The final weight of tree $T_j$ is $w_j = \alpha_j \beta_j \gamma_j$. Here, these three weights are considered as having equal importance. Then the trees are sorted based on the weights w in descending order $\hat{T}$.

Optimisation

The optimisation of the algorithm on performance given test time $t_w$ and speed given minimal accuracy $\eta_w$ are done based on the weights of trees w.

Relative accuracy—Based on the analysis from the previous subsections, the accuracy can be defined reasonably. It is assumed that testing all attributes with all trees in the random forest has 100% accuracy, and the estimated accuracy $\eta_g$ is a relative accuracy. Here, a F1 measurement is used to calculate the relative accuracy $\eta_g$ of the algorithm according to the proposal. $T_o(T_o \subseteq T_e)$ is the set of selected encrypted trees, recall can be defined as $p_{rec} = \Sigma_{j \in T} \alpha_j/N$, which represents the fraction of evaluated weighted-trees. The precision can be defined as $$p_{prec} = \frac{\sum_{j \in T_o} \alpha_j \gamma_j + \sum_{j \in T/T_e} \alpha_j \gamma_j}{\sum_{j \in T} \alpha_j \gamma_j} \quad (3)$$

where it is assumed that trees with less missing data (attributes) and high important scores have higher precision. The final relative test accuracy can calculated as F1 measure $$\eta_g = 2 \cdot \frac{p_{prec} \cdot p_{rec}}{p_{prec} + p_{rec}} = \frac{2}{\left[\frac{N}{\sum_{j \in T} \alpha_j} + \frac{\sum_{j \in T} \alpha_j \gamma_j}{\sum_{j \in T_o} \alpha_j \gamma_j + \sum_{j \in T/T_e} \alpha_j \gamma_j}\right]} \quad (4)$$

where $\eta_{low} \leq \eta g \leq 1$. Here, $$\eta_{low} = 2 / \left[\frac{N}{\sum_{j \in T_e} \alpha_j} + \frac{\sum_{j \in T} \alpha_j \gamma_j}{\sum_{j \in T/T_e} \alpha_j \gamma_j}\right]$$

is the minimal accuracy when no private attributes are evaluated.

Optimisation with $t_w$—The required encrypted trees can be sorted accordingly based on w as $\hat{T}$. The evaluation time cost for encrypted tree $\hat{T}_j$ in $\hat{T}$ can be precomputed as $2t_e(|A_e|+1)\hat{S}_j$. The optimization is to select as many trees as possible within the time budget $t_w$. Here, a heuristic approach is proposed that selects trees one by one based on tree weight w until the next tree cannot fit in the time budget any longer. In practice, a greedy search could be used to select trees with less priority from the rest of the forest (in the same order based on w) which can still fit in the budget. The selection stops when no tree in the forest can fit in the budget. Let $\hat{T}_o$ ($\hat{T}_o \subseteq T_e$) be the set of selected encrypted trees, and the number of regular trees is $N-|T_e|$. The estimation of accuracy given the time budget is shown in Algorithm 1 below.

| Algorithm 1 Estimating accuracy given time budget |
|---|
| 1: Input: A, $A_e(A_e \subseteq A)$, T, $t_w$ |
| 2: Output: $\eta_g$, $t_g$ |
| 3: for j = 1 to N do |
| 4: $\quad w_j = \alpha_j \beta_j \gamma_j$ (defined in Subsection Weights of trees) |
| 5: $\hat{T} \leftarrow$ Sort(T) (sorting descending on $w_j$) |
| 6: select trees $\tilde{T}_o$ with subsection Optimization with $t_w$ or $\eta_w$. |
| 7: compute $t_g$ with Equation 5 |
| 8: compute $\eta_g$ with Equation 7. |

Optimization with $\eta_w$—Similarly, the optimisation on given minimal accuracy $\eta_w$ is to select trees one by one based on w order, and it stops once $\eta \geq \eta_w$. Let $\tilde{T}_o$ ($\tilde{T}_o \subseteq T_e$) be the set of selected encrypted trees, if $\eta_w \leq \eta_{low}$, no encrypted tree is selected ($\tilde{T}_o \subseteq \emptyset$), and only public trees are evaluated. Due to the complexity of optimising accuracy, here trees are simply added according to their weights w one by one until the minimal accuracy is reached, because evaluating more trees will decrease the speed.

The following discussion relates to the results obtained in the results stage 28.

Time Efficiency

As discussed above, public and replaced missing attributes cost no evaluation time. The evaluation time cost is only due to encrypted attributes and trees. All non-missing attributes cost input time, as showed above. The total time cost of the algorithm is $$t_g = 2t_\alpha[|A_e|+|A|\Sigma_{j \in T_e}S_j] + 2t_e \cdot (|A_e|+1)\Sigma_{j \in T_e}S_j \quad (5)$$

The percentage of time cost compared to using a fully encrypted algorithm is $$t_{pg} = \frac{t_a\left[|A|\sum_{j \in T_e}S_j + (|A_e|)\right] + t_e \cdot (|A_e|+1)\sum_{j \in T_e}S_j}{t_a\left[|A|\sum_{j \in T}S_j + (|A|)\right] + t_e \cdot (|A|+1)\sum_{j \in T}S_j} \quad (6)$$

On Amazon machine, each multiplication takes around 2.2e-5 seconds, and inputs cost around 2.0e-6 seconds. Assuming there are 200 trees and 100 of them are encrypted, 200 attributes in total, 50 of the attributes are private, and each tree has 100 nodes. If the test data has 100 objects, it will take 5.14 hours to process testing data with encrypted trees and attributes, compared to only 50 minutes with the proposed techniques. In this example, the proposed techniques save 83.8% of time. Varying the value of $|A_e|$ or $|T_e|$ changes $t_{pg}$ linearly. In the proposed techniques, $t_{low}$=8.8 seconds and $t_{high}$=50 minutes can be computed in the above example, and thus the time budget can be adjusted within this range to vary the accuracy.

Relative Accuracy

As discussed above, given selected encrypted trees $\tilde{T}_o$ ($\tilde{T}_o \subseteq T_e$), the final relative test accuracy can calculated as $$\eta_g = \frac{2}{\left[\frac{N}{\sum_{j \in T}\alpha_j} + \frac{\sum_{j \in T}\alpha_j\gamma_j}{\sum_{j \in \tilde{T}_o}\alpha_j\gamma_j + \sum_{j \in T/T_e}\alpha_j\gamma_j}\right]}, (\eta_{low} \leq \eta_g \leq 1) \quad (7)$$

Several extensions of the techniques described above are possible.

Based on the random forest example set out above, general principles of the types of machine learning algorithm that can be applied in the techniques presented herein can be derived. They are (i) a subset of attributes can be evaluated by a part of algorithm (trees is this case) individually; (ii) the final algorithm output is a joint decision of all algorithm parts. For instance, SVM basically computes the inner product between a vector of attributes and SVM weights (trained algorithm), where any single attribute can be evaluated by the corresponding SVM weight individually, and the final decision is a sum operation instead of majority voting. Again, it is possible to hide the values that are summed: the sum can be computed in MPC and only output whether or not it reached the required threshold.

Another extension relates to allowing the use of anonymized versions of attributes, such as using age range (e.g. [10; 20]) instead of the exact number (e.g. 13), to further trade off among speed, accuracy and sensitivity. Considering the fact that anonymised attribute can be treated as public attributes, the advantages of using anonymised attributes are it gives the data owner 20 more options to deal with sensitivity, as the attribute can be set in between public and private;

it allows the replacement of a private attribute with an anonymized attribute, and so the algorithm could gain more speed with a controlled privacy level;

using anonymised attributes instead of leaving missing attributes out of the test, the algorithm could gain more accuracy without sacrificing speed.

Another extension relates to the algorithm or algorithm owner node 22 providing guidance for constructing the proposal 30 or revised proposal 30. Thus, instead of just providing feedback on accuracy given time or time given accuracy in the pre-analysis stage 24, the algorithm owner node 22 could provide suggestions to guide the user/data owner node 20 to adjust their proposal 30 faster and better, for instance, with $t_A$ more seconds, or $A_A$ more non-missing attributes, accuracy can go up by $\eta_A$, or vice versa.

The techniques described herein can be applied to many use cases, for instance, analysing bank data, hospital data, etc. together with external software experts. A typical application is hospital data, where the hospital as data owner 20 has data for patients, and the external expert as algorithm owner 22 has algorithms trained with big data. The hospital wants to analyse their data with the well trained algorithm from the external expert without sharing the full data because of the sensitivity of certain attributes. The external expert doesn't want to share the algorithm with the hospital. Usually, the analysis is done based on a fully secured multi-party computation framework, which is very time consuming if the attributes and data set are large. In the techniques presented herein, the algorithm owner node 22 gives the hospital the freedom to personalise the analysis by trading off among accuracy, speed, and sensitivity, it allows partially secured analysis with one machine learning algorithm, and it helps the data owner 20 to adjust the algorithm by fast pre-analysis on speed and accuracy.

There are therefore provided ways to enable a user to customise or adapt the evaluation of a set of input data by an algorithm to meet their own requirements for the evaluation, such as speed and accuracy.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method of operating a first node, the first node having an algorithm for evaluating input data from another node, the input data having a plurality of different attributes, the method comprising:
   receiving, from a second node having access to one or more data sets that are private to the second node, a proposal for the evaluation of a first set of input data by the algorithm, wherein the first set of input data comprises attributes that are private to the second node and wherein the proposal does not disclose the first set of input data to first node;
   estimating the performance of the algorithm in evaluating the first set of input data based on the proposal, wherein any part of the first set of input data for which attributes are private to the second node is to be evaluated using a multiparty computation, MPC-based random forest, and wherein the step of estimating the performance of the algorithm comprises determining an indication of a time required to complete the evaluation of the first set of input data by:
      determining an evaluation time cost for evaluating all encrypted trees in the random forest to be used for the evaluation of the first set of input data, wherein the encrypted trees are used to evaluate attributes of the first set of input data that are private to the second node;
      determining an input time cost for evaluating all inputs to the algorithm, wherein the input time cost is the time cost of inputting private attributes to the algorithm; and
      determining the indication of the time required as the sum of the determined evaluation time cost and the determined input time cost; and
   outputting, to the second node, an indication of the estimated performance of the algorithm;
   receiving, from the second node, a second indication that the estimated performance is acceptable; and
   evaluating, by the first node, at least a portion of the first set of input data using the algorithm in response to receiving the second indication.

2. A computer-implemented method as claimed in claim 1, wherein the step of estimating the performance of the algorithm comprises determining an indication of the accuracy level for the evaluation of the first set of input data and/or an indication of a time required to complete the evaluation of the first set of input data.

3. A computer-implemented method as claimed in claim 1, wherein the received proposal comprises an indication of the minimum accuracy level for the evaluation of the first set of input data, and wherein the step of estimating the performance of the algorithm comprises:
   determining an indication of the time required to complete the evaluation of the first set of input data at the indicated minimum accuracy level.

4. A computer-implemented method as claimed in claim 3, wherein the step of determining an indication of the time required to complete the evaluation of the first set of input data at the indicated minimum accuracy level comprises:
   determining the indication of the time required based on one or more of a complexity level of the algorithm, the number of data elements in the first set of input data, the attributes of the first set of input data and the number of attributes of the first set of input data that are private to the second node.

5. A computer-implemented method as claimed in claim 1, wherein the received proposal comprises an indication of the maximum time permitted to complete the evaluation of the first set of input data, and wherein the step of estimating the performance of the algorithm comprises:
   determining an indication of the accuracy level for the evaluation of the first set of input data based on completing the evaluation of the first set of input data in the indicated maximum time permitted.

6. A computer-implemented method as claimed in claim 5, wherein the step of determining an indication of the accuracy level for the evaluation of the first set of input data comprises:
   determining the indication of the accuracy level for the evaluation based on one or more of the number of data elements in the first set of input data, and the attributes of the first set of input data or the attributes that are missing from the first set of input data.

7. A computer-implemented method as claimed in claim 1, wherein the method further comprises the steps of:
   following the step of outputting the indication, receiving, from the second node, a revised proposal for the evaluation of the first set of input data; and
   repeating the steps of estimating and outputting the indication based on the revised proposal.

8. A computer-implemented method as claimed in claim 1, wherein the method further comprises the steps of:
   following the step of outputting the indication, receiving, from the second node, an indication that the evaluation of the first set of input data by the algorithm according to the proposal is to proceed; and
   receiving any parts of the input data that are non-private from the second node; evaluating the received parts of the input data that are non-private using the algorithm;
   evaluating any parts of the input data that are private using the algorithm, wherein the algorithm is evaluated as a multiparty computation (MPC) with the second node; and
   combining the results of the evaluation of the received parts of the input data that are non-private and the result of the evaluation of the received parts of the input data that are private to determine the output of the algorithm.

9. A computer-implemented method as claimed in claim 8, wherein the method further comprises the step of:
   providing the determined output of the algorithm to the second node.

10. A computer-implemented method as claimed in claim 8, wherein the method further comprises the steps of:
    determining a measure of the accuracy of the output of the algorithm; and
    providing the determined measure of the accuracy to the second node.

11. A computer-implemented method as claimed in claim 1, wherein the received proposal comprises an indication of the minimum accuracy level for the evaluation of the first set of input data, and wherein the method further comprises the step of:
   optimising the algorithm to provide at least the indicated minimum accuracy level while minimising the time required for the evaluation.

12. A computer-implemented method as claimed in claim 1, wherein the received proposal comprises an indication of the maximum time permitted for the evaluation of the first set of input data, and wherein the method further comprises the step of:
   optimising the algorithm to maximise the accuracy level of the evaluation within the indicated maximum time permitted for the evaluation.

13. A computer-implemented method as claimed in claim 1, wherein the step of determining the evaluation time cost comprises determining:
   evaluation time cost, $t_{ev}=2t_e|A_e|\Sigma_{j\in T_e}S_j$
   where $t_e$ is the evaluation time cost of one multiplication, $S_j$ is the number of nodes in an encrypted tree, $T_j$, $|A_e|$ is the total number of private attributes and $T_e$ is a set of encrypted trees to be used.

14. A computer-implemented method as claimed in claim 1, wherein the step of determining the input time cost comprises determining:
   input time cost, $t_{in}=2\,t_\alpha|A|\Sigma_{j\in T_e}S_j+2t_\alpha|A_e|$
   where $t_\alpha$ is the time cost of one attribute, $S_j$ is the number of nodes in an encrypted tree $T_j$, $|A_e|$ is the total number of private attributes, $|A|$ is the total number of attributes and $T_e$ is a set of encrypted trees to be used.

15. A computer-implemented method as claimed in claim 1, wherein the step of estimating the performance of the algorithm further comprises determining an indication of an accuracy level for the evaluation of the first set of input data by determining:

$$\text{accuracy level, } \eta_g = \frac{2}{\left[\dfrac{N}{\sum_{j\in T}\alpha_j}+\dfrac{\Sigma_{j\in T}\alpha_j\gamma_j}{\sum_{j\in T_o}\alpha_j\gamma_j+\sum_{j\in T/T_e}\alpha_j\gamma_j}\right]}, (\eta_{low}\le \eta_g \le 1)$$

where N is the number of decision trees $T=\{T_j\}_N$, $\alpha_j$ is the fraction of evaluated non-missing attributes in a tree, $\gamma_j$ represents tree importance, $T_e$ is the encrypted tree with the highest priority.

16. A computer-implemented method as claimed in claim 1, wherein the proposal comprises one or more of an indication of the number of data elements in the first set of input data, an indication of the attributes of the first set of input data, an indication of which of the attributes of the first set of input data are private to the second node, and one of (i) an indication of a minimum accuracy level for the evaluation, and (ii) an indication of the maximum time permitted to complete the evaluation.

17. A computer program product comprising a non-transitory computer readable medium having computer readable code embodied therein, the computer readable code being configured such that, on execution by a suitable computer or processor, the computer or processor is caused to perform the method of claim 1.

18. A first node, the first node having an algorithm for evaluating input data from another node, the input data having a plurality of different attributes, wherein the first node is configured to:
   receive, from a second node having access to one or more data sets that are private to the second node, a proposal for the evaluation of a first set of input data by the algorithm, wherein the first set of input data comprises attributes that are private to the second node and wherein the proposal does not disclose the first set of input data to the first node;
   estimate the performance of the algorithm in evaluating the first set of input data based on the proposal, wherein any part of the first set of input data for which attributes are private to the second node is to be evaluated using a multiparty computation, MPC-based random forest, and wherein the step of estimating the performance of the algorithm comprises determining an indication of a time required to complete the evaluation of the first set of input data by:
      determining an evaluation time cost for evaluating all encrypted trees in the random forest to be used for the evaluation of the first set of input data, wherein the encrypted trees are used to evaluate attributes of the first set of input data that are private to the second node;
      determining an input time cost for evaluating all inputs to the algorithm, wherein the input time cost is the time cost of inputting private attributes to the algorithm; and
      determining the indication of the time required as the sum of the determined evaluation time cost and the determined input time cost; and
   output, to the second node, an indication of the estimated performance of the algorithm;
   receive, from the second node, a second indication that the estimated performance is acceptable; and
   evaluate at least a portion of the first set of input data using the algorithm in response to receiving the second indication.

19. The first node as claimed in claim 18, wherein the first node is further configured to estimate the performance of the algorithm by determining an indication of the accuracy level for the evaluation of the first set of input data and/or an indication of a time required to complete the evaluation of the first set of input data.

20. The first node as claimed in claim 18, wherein the received proposal comprises an indication of the minimum accuracy level for the evaluation of the first set of input data, and wherein the first node is configured to estimate the performance of the algorithm by:
   determining an indication of the time required to complete the evaluation of the first set of input data at the indicated minimum accuracy level.

21. The first node as claimed in claim 20, wherein the first node is configured to determine an indication of the time required to complete the evaluation of the first set of input data at the indicated minimum accuracy level by:
   determining the indication of the time required based on one or more of a complexity level of the algorithm, the number of data elements in the first set of input data, the attributes of the first set of input data and the number of attributes of the first set of input data that are private to the second node.

22. The first node as claimed in claim 18, wherein the received proposal comprises an indication of the maximum time permitted to complete the evaluation of the first set of input data, and wherein the first node is configured to estimate the performance of the algorithm by:
  determining an indication of the accuracy level for the evaluation of the first set of input data based on completing the evaluation of the first set of input data in the indicated maximum time permitted.

23. The first node as claimed in claim 18, wherein the first node is further configured to:
  receive, from the second node, a revised proposal for the evaluation of the first set of input data following the output of the indication; and
  repeat the estimating and outputting based on the revised proposal.

24. The first node as claimed in claim 18, wherein the first node is further configured to:
  receive, from the second node, an indication that the evaluation of the first set of input data by the algorithm according to the proposal is to proceed following the output of the indication; and
  receive any parts of the input data that are non-private from the second node;
  evaluate the received parts of the input data that are non-private using the algorithm;
  evaluate any parts of the input data that are private using the algorithm, wherein the algorithm is evaluated as a multiparty computation (MPC) with the second node; and
  combine the results of the evaluation of the received parts of the input data that are non-private and the result of the evaluation of the received parts of the input data that are private to determine the output of the algorithm.

* * * * *